(12) United States Patent
Ovshinsky et al.

(10) Patent No.: US 7,238,446 B2
(45) Date of Patent: Jul. 3, 2007

(54) ACTIVE ELECTRODE COMPOSITION WITH CONDUCTIVE POLYMERIC BINDER

(75) Inventors: Stanford R. Ovshinsky, Bloomfield Hills, MI (US); Boyko Aladjov, Rochester Hills, MI (US); Bora Tekkanat, Ann Arbor, MI (US); Srinivasan Venkatesan, Southfield, MI (US); Subhash K. Dhar, Bloomfield, MI (US)

(73) Assignee: Ovonic Battery Company, Inc., Rochester Hills, MI (US)

( * ) Notice: Subject to any disclaimer, the term of this patent is extended or adjusted under 35 U.S.C. 154(b) by 0 days.

(21) Appl. No.: 10/329,221

(22) Filed: Dec. 24, 2002

(65) Prior Publication Data

US 2004/0121228 A1 Jun. 24, 2004

(51) Int. Cl.
*H01M 4/62* (2006.01)
(52) U.S. Cl. ............... 429/218.2; 429/217; 429/223; 429/232; 429/206
(58) Field of Classification Search .......... 429/217, 429/223, 218.1, 218.2, 232, 221, 222, 229, 429/206
See application file for complete search history.

(56) References Cited

U.S. PATENT DOCUMENTS

| | | | | |
|---|---|---|---|---|
| 4,551,400 A | * | 11/1985 | Sapru et al. ............... 429/209 |
| 4,687,598 A | * | 8/1987 | Varma ....................... 429/213 |
| 4,976,904 A | | 12/1990 | Bilhorn |
| 5,495,250 A | * | 2/1996 | Ghaem et al. ............... 429/52 |
| 5,523,182 A | * | 6/1996 | Ovshinsky et al. ......... 429/223 |
| 5,721,066 A | * | 2/1998 | Hong et al. ................ 429/223 |
| 5,733,680 A | | 3/1998 | Hong |
| 6,017,655 A | * | 1/2000 | Ovshinsky et al. ......... 429/232 |
| 6,150,054 A | * | 11/2000 | Ovshinsky et al. ......... 429/223 |
| 6,218,047 B1 | * | 4/2001 | Ovshinsky et al. ......... 429/223 |
| 6,399,247 B1 | * | 6/2002 | Kitayama et al. ........... 429/223 |
| 6,617,072 B2 | * | 9/2003 | Prasad et al. .............. 429/223 |
| 6,634,270 B2 | * | 10/2003 | Sato et al. ................. 83/407 |
| 2001/0012586 A1 | * | 8/2001 | Hong et al. ................ 429/223 |
| 2003/0143462 A1 | * | 7/2003 | Han et al. ................ 429/218.1 |

FOREIGN PATENT DOCUMENTS

| | | | |
|---|---|---|---|
| JP | 2-33853 | * | 2/1990 |
| JP | 2-162648 | * | 6/1990 |
| JP | 6-187979 | * | 7/1994 |
| JP | 2000-188102 | * | 7/2000 |
| RU | 2194341 | * | 12/2002 |

OTHER PUBLICATIONS

Linden et al. "Handbook of Batteries", 3rd edition, 1972, p. 3.19.*

* cited by examiner

*Primary Examiner*—Laura Weiner
(74) *Attorney, Agent, or Firm*—Robert J. Svobuda (57) ABSTRACT

An active composition for an electrode of an electrochemical cell. The active composition comprises an active electrode material and a conductive polymer. The electrochemical cell is preferably a battery cell or a fuel cell.

12 Claims, 4 Drawing Sheets

ACTIVE ELECTRODE COMPOSITION WITH CONDUCTIVE POLYMERIC BINDER

FIELD OF THE INVENTION

The present invention relates to active formulations for electrodes of electrochemical cells. In particular, the present invention relates to active formulations comprising a conductive polymeric binder for use in electrochemical cells.

BACKGROUND OF THE INVENTION

In rechargeable electrochemical battery cells, weight and portability are important considerations. It is also advantageous for rechargeable battery cells to have long operating lives without the necessity of periodic maintenance. Rechargeable electrochemical battery cells are used in numerous consumer devices such as calculators, portable radios, and cellular phones. They are often configured into a sealed power pack that is designed as an integral part of a specific device. Rechargeable electrochemical cells can also be configured as larger "cell packs" or "battery packs".

Rechargeable electrochemical battery cells may be classified as "nonaqueous" cells or "aqueous" cells. An example of a nonaqueous electrochemical battery cell is a lithium-ion cell, which uses intercalation compounds for both anode and cathode, and a liquid organic or polymer electrolyte. Aqueous electrochemical cells may be classified as either "acidic" or "alkaline". An example of an acidic electrochemical battery cell is a lead-acid cell, which uses lead dioxide as the active material of the positive electrode and metallic lead, in a high-surface area porous structure, as the negative active material. Many of the alkaline electrochemical battery cells are nickel based. Examples of such cells are nickel cadmium cells (NiCd), nickel metal hydride cells (NiMH), nickel hydrogen cells (NiH), nickel zinc cells (NiZn), and nickel iron cells (NiFe).

Ni—MH cells use negative electrodes having a hydrogen absorbing alloy as the active material. The hydrogen absorbing alloy is capable of the reversible electrochemical storage of hydrogen. Ni—MH cells typically use a positive electrode having nickel hydroxide as the active material. The negative and positive electrodes are spaced apart in an alkaline electrolyte such as potassium hydroxide.

Upon application of an electrical current across a NiMH cell, water is dissociated into a hydroxyl ion and a hydrogen ion at the surface of the negative electrode. The hydrogen ion combines with one electron and forms atomic hydrogen and diffuses into the bulk of the hydrogen storage alloy. This reaction is reversible. Upon discharge, the stored hydrogen is released to form a hydrogen ion and an electron. The hydrogen ion combines with a hydroxyl ion to form water. This is shown in equation (1):

The reactions that take place at the nickel hydroxide positive electrode of a Ni—MH battery cell are shown in equation (2):

The use of disordered negative electrode metal hydride material significantly increases the reversible hydrogen storage characteristics required for efficient and economical electrochemical cell applications, and results in the commercial production of electrochemical cells having high energy density storage, efficient reversibility, high electrical efficiency, bulk hydrogen storage without structural change or poisoning, long cycle life, and deep discharge capability.

Certain hydrogen absorbing alloys result from tailoring the local chemical order and local structural order by the incorporation of selected modifier elements into a host matrix. Disordered hydrogen absorbing alloys have a substantially increased density of catalytically active sites and storage sites compared to single or multi-phase crystalline materials. These additional sites are responsible for improved efficiency of electrochemical charging/discharging and an increase in electrical energy storage capacity. The nature and number of storage sites can even be designed independently of the catalytically active sites. More specifically, these alloys are tailored to allow bulk storage of the dissociated hydrogen atoms at bonding strengths within the range of reversibility suitable for use in secondary battery applications.

The use of disordered negative electrode metal hydride material significantly increases the reversible hydrogen storage characteristics required for efficient and economical battery applications, and results in the commercial production of batteries having high energy density storage, efficient reversibility, high electrical efficiency, bulk hydrogen storage without structural change or poisoning, long cycle life, and deep discharge capability.

Some extremely efficient electrochemical hydrogen storage alloys were formulated, based on the disordered materials described above. These are the Ti—V—Zr—Ni type active materials such as disclosed in U.S. Pat. No. 4,551,400 ("the '400 Patent") the disclosure of which is incorporated herein by reference. These materials reversibly form hydrides in order to store hydrogen. All the materials used in the '400 Patent utilize a generic Ti—V—Ni composition, where at least Ti, V, and Ni are present and may be modified with Cr, Zr, and Al. The materials of the '400 Patent are multiphase materials, which may contain, but are not limited to, one or more phases with $C_{14}$ and $C_{15}$ type crystal structures.

Other Ti—V—Zr—Ni alloys, also used for rechargeable hydrogen storage negative electrodes, are described in U.S. Pat. No. 4,728,586 ("the '586 Patent"), the contents of which is incorporated herein by reference. The '586 Patent describes a specific sub-class of Ti—V—Ni—Zr alloys comprising Ti, V, Zr, Ni, and a fifth component, Cr. The '586 Patent, mentions the possibility of additives and modifiers beyond the Ti, V, Zr, Ni, and Cr components of the alloys, and generally discusses specific additives and modifiers, the amounts and interactions of these modifiers, and the particular benefits that could be expected from them. Other hydrogen absorbing alloy materials are discussed in U.S. Pat. Nos. 5,096,667, 5,135,589, 5,277,999, 5,238,756, 5,407,761, and 5,536,591, the contents of which are incorporated herein by reference.

The positive electrodes of a Ni—MH battery cell include a nickel hydroxide material as the active electrode material.

Generally, any nickel hydroxide material may be used. The nickel hydroxide material used may be a disordered material. The use of disordered materials allow for permanent alteration of the properties of the material by engineering the local and intermediate range order. The general principles are discussed in U.S. Pat. No. 5,348,822, the contents of which are incorporated by reference herein. The nickel hydroxide material may be compositionally disordered. "Compositionally disordered" as used herein is specifically defined to mean that this material contains at least one compositional modifier and/or a chemical modifier. Also, the nickel hydroxide material may also be structurally disordered. "Structurally disordered" as used herein is specifically defined to mean that the material has a conductive surface and filamentous regions of higher conductivity, and further, that the material has multiple or mixed phases where alpha, beta, and gamma-phase regions may exist individually or in combination.

The nickel hydroxide material may comprise a compositionally and structurally disordered multiphase nickel hydroxide host matrix which includes at least one modifier chosen from the group consisting of Al, Ba, Bi, Ca, Co, Cr, Cu, F, Fe, In, K, La, Li, Mg, Mn, Na, Nd, Pb, Pr, Ru, Sb, Sc, Se, Sn, Sr, Te, Ti, Y, and Zn. The nickel hydroxide material may include a compositionally and structurally disordered multiphase nickel hydroxide host matrix which includes at least three modifiers chosen from the group consisting of Al, Ba, Bi, Ca, Co, Cr, Cu, F, Fe, In, K, La, Li, Mg, Mn, Na, Nd, Pb, Pr, Ru, Sb, Sc, Se, Sn, Sr, Te, Ti, Y, and Zn. These embodiments are discussed in detail in commonly assigned U.S. Pat. No. 5,637,423 the contents of which is incorporated by reference herein.

The nickel hydroxide materials may be multiphase polycrystalline materials having at least one gamma-phase that contain compositional modifiers or combinations of compositional and chemical modifiers that promote the multiphase structure and the presence of gamma-phase materials. These compositional modifiers are chosen from the group consisting of Al, Bi, Co, Cr, Cu, Fe, In, $LaH_3$, Mg, Mn, Ru, Sb, Sn, $TiH_2$, TiO, Zn. Preferably, at least three compositional modifiers are used. The nickel hydroxide materials may include the non-substitutional incorporation of at least one chemical modifier around the plates of the material. The phrase "non-substitutional incorporation around the plates", as used herein means the incorporation into interlamellar sites or at edges of plates. These chemical modifiers are preferably chosen from the group consisting of Al, Ba, Ca, Co, Cr, Cu, F, Fe, K, Li, Mg, Mn, Na, Sr, and Zn.

The nickel hydroxide material may comprise a solid solution nickel hydroxide material having a multiphase structure that comprises at least one polycrystalline gamma-phase including a polycrystalline gamma-phase unit cell comprising spacedly disposed plates with at least one chemical modifier incorporated around the plates. The plates may have a range of stable intersheet distances corresponding to a $2^+$ oxidation state and a $3.5^+$, or greater, oxidation state. The nickel hydroxide material may include at least three compositional modifiers incorporated into the solid solution nickel hydroxide material to promote the multiphase structure. This embodiment is fully described in U.S. Pat. No. 5,348,822, the contents of which is incorporated by reference herein.

Preferably, one of the chemical modifiers is chosen from the group consisting of Al, Ba, Ca, Co, Cr, Cu, F, Fe, K, Li, Mg, Mn, Na, Sr, and Zn. The compositional modifiers may be chosen from the group consisting of a metal, a metallic oxide, a metallic oxide alloy, a metal hydride, and a metal hydride alloy. Preferably, the compositional modifiers are chosen from the group consisting of Al, Bi, Co, Cr, Cu, Fe, In, $LaH_3$, Mn, Ru, Sb, Sn, $TiH_2$, TiO, and Zn. In one embodiment, one of the compositional modifiers is chosen from the group consisting of Al, Bi, Co, Cr, Cu, Fe, In, $LaH_3$, Mn, Ru, Sb, Sn, $TiH_2$, TiO, and Zn. In another embodiment, one of the compositional modifiers is Co. In an alternate embodiment, two of the compositional modifiers are Co and Zn. The nickel hydroxide material may contain 5 to 30 atomic percent, and preferable 10 to 20 atomic percent, of the compositional or chemical modifiers described above.

The disordered nickel hydroxide electrode materials may include at least one structure selected from the group consisting of (i) amorphous; (ii) microcrystalline; (iii) polycrystalline lacking long range compositional order; and (iv) any combination of these amorphous, microcrystalline, or polycrystalline structures.

Also, the nickel hydroxide material may be a structurally disordered material comprising multiple or mixed phases where alpha, beta, and gamma-phase region may exist individually or in combination and where the nickel hydroxide has a conductive surface and filamentous regions of higher conductivity.

Nickel-metal hydride batteries are used in many different applications. For example, nickel-metal hydride batteries are used in numerous consumer devices such as calculators, portable radios, and cellular phones. They are also used in many different vehicle applications. For example, nickel-metal hydride batteries are used to drive both pure electric vehicles (EV) as well as hybrid electric vehicles (HEV). Hybrid electric vehicles utilize the combination of a combustion engine and an electric motor driven from a battery.

There are different requirements for the energy storage system of a hybrid electric vehicle than for a pure electric vehicle. Range is a critical factor for a practical pure electric vehicle, making energy density the critical evaluation parameter. In contrast, in hybrid electric vehicle applications, gravimetric and volumetric power density is the overwhelming consideration. A key enabling requirement for HEV systems is an energy storage system capable of providing very high peak power combined with high energy density while at the same time accepting high regenerative braking currents at very high efficiency.

The output power of a battery may be increased by reducing the battery's internal resistance. The internal resistance of the battery includes the resistance of both the positive and negative electrodes, the resistance of the electrolyte, separators as well as other components. The resistance of the electrodes may be decreased by lowering the resistance of the electrode components such as the electrode tabs, electrode substrates as well as the resistance of the electrode active compositions. The resistance of the electrode substrates may be lowered by using more conductive materials (such as copper) wherever possible. The resistance of the positive and/or negative active electrode compositions may be lowered by adding conductive additives to the active material. For example, conductive additives (such as nickel, graphite and carbon particles) may be mixed together with the active electrode materials to form an active electrode composition having an increased conductivity. The methods discussed above, while lowering the resistance and increasing the power of the electrodes have still not realized the full potential thereof. There is still a need for significant gains in power. Therefore, there is a need in the art for additional improvements in the conductivity for both the positive and negative electrodes.

SUMMARY OF THE INVENTION

One aspect of the present invention is an active composition for an electrode of an electrochemical cell, comprising: an active electrode material; and a conductive polymer.

Another aspect of the present invention is an electrode for an electrochemical cell, comprising: an active composition including an active electrode material and a conductive polymer.

Another aspect of the present invention is an electrochemical cell, comprising: a positive electrode; a negative electrode; and an electrolyte, wherein at least one of the positive electrode or the negative electrode comprises an active composition including an active electrode material and a conductive polymer.

DETAILED DESCRIPTION OF THE INVENTION

Disclosed herein is an active composition for an electrode for an electrochemical cell. As used herein the term "electrochemical cell" includes battery cells, fuel cells, and electrolyzers. Hence, the active composition of the present invention is applicable to the electrodes of battery cells, the electrodes of fuel cells as well as to the electrodes of electrolyzers.

The electrochemical cells include both non-aqueous as well as aqueous cells electrochemical cells. As noted above, an example of a non-aqueous cell is a lithium-ion cell. Aqueous electrochemical cells include acidic and alkaline electrochemical cells. Alkaline electrochemical cells include an alkaline electrolyte. An alkaline electrolyte is preferably an aqueous solution of an alkali metal hydroxide. Examples of alkali metal hydroxides include potassium hydroxide, lithium hydroxide and sodium hydroxide.

The active composition of the present invention comprises an active electrode material and an electrically conductive polymer. Generally, the active electrode material may be any active electrode material known in the art and includes active electrode materials for battery cells as well as active electrode material for fuel cells. The active electrode material may be an active positive electrode material or an active negative electrode material. The active positive electrode material may be an active material for the positive electrode of a battery cell or it may be an active material for the positive electrode of a fuel cell (where the positive electrode of a fuel cell is the air electrode and is also referred to as the "cathode" of the fuel cell). The active negative electrode material may be an active material for the negative electrode of a battery cell or it may be the active material for the negative electrode of a fuel cell (where the negative electrode of a fuel cell is the hydrogen electrode and is also referred to as the fuel cell "anode"). Any active positive electrode material and any active negative electrode material (for either a battery cell or a fuel cell) is within the scope of this invention.

Examples of active positive electrode materials for a positive electrode of a battery cell include, but are not limited to, lead dioxide, lithium cobalt dioxide, lithium nickel dioxide, lithium manganese oxide compounds, lithium vanadium oxide compounds, lithium iron oxide, lithium compounds (as well as complex oxides of these compounds), transition metal oxides, manganese dioxide, zinc oxide, nickel oxide, nickel hydroxide, manganese hydroxide, copper oxide, molybdenum oxide and carbon fluoride. Combinations of these materials may also be used. A preferred active positive electrode material for a battery cell is a nickel hydroxide material. It is within the scope of this invention that any nickel hydroxide material may be used. Examples of nickel hydroxide materials are provided above. The active positive electrode material may even include internally embedded conductive materials (such as nickel fibers) as disclosed in U.S. Pat. No. 6,177,213, the disclosure of which is hereby incorporated by reference herein.

Examples of active positive electrode materials for the positive electrode (i.e. the oxygen electrode or "cathode") of a fuel cell include, but not limited to, platinum, silver, manganese, manganese oxides (such as manganese dioxide), cobalt. Combinations of these materials may also be used.

Examples of active negative electrode materials for the negative electrode of a battery cell include, but not limited to, metallic lithium and like alkali metals, alkali metal absorbing carbon materials, zinc, zinc oxide, cadmium, cadmium oxide, cadmium hydroxide, iron, iron oxide, and hydrogen storage alloys. A preferred active negative electrode material for the negative electrode of a battery cell is a hydrogen storage alloy. It is within the spirit and scope of this invention that any hydrogen storage alloy may be used as an active material for the negative electrode of a battery cell.

Examples of negative electrode materials for the negative electrode (hydrogen electrode or anode) of a fuel cell include, but are not limited to, hydrogen storage alloys as well as the noble metals such as platinum, palladium and gold. It is within the spirit and scope of this invention that any hydrogen storage alloy may be used as an active material for the negative electrode of a fuel cell.

Hence, hydrogen storage alloys may be used as the active electrode material for the negative electrodes of either battery cells or fuel cells. Generally, any hydrogen storage alloy may be used. Hydrogen storage alloys include, without limitation, AB, $AB_2$ and $AB_5$ type alloys. For example, hydrogen storage alloys may be selected from rare-earth/ Misch metal alloys, zirconium alloys or titanium alloys. In addition mixtures of alloys may be used. An example of a particular hydrogen storage material is a hydrogen storage alloy having the composition $(Mm)_a Ni_b Co_c Mn_d Al_e$ where Mm is a Misch Metal comprising 60 to 67 atomic percent La, 25 to 30 weight percent Ce, 0 to 5 weight percent Pr, 0 to 10 weight percent Nd; b is 45 to 55 weight percent; c is 8 to 12 weight percent; d is 0 to 5.0 weight percent; e is 0 to 2.0 weight percent; and a+b+c+d+e=100 weight percent. Other examples of hydrogen storage alloys are described above.

The conductive polymers used in the active composition are intrinsically electrically conductive materials. Generally, any conductive polymer may be used in the active composition. Examples of conductive polymers include conductive polymer compositions based on polyaniline such as the electrically conductive compositions disclosed in U.S. Pat. No. 5,783,111, the disclosure of which is hereby incorporated by reference herein. Polyaniline is a family of polymers. Polyanilines and their derivatives can be prepared by the chemical or electrochemical oxidative polymerization of aniline ($C_6H_5NH_2$). Polyanilines have excellent chemical stability and relatively high levels of electrical conductivity in their derivative salts. The polyaniline polymers can be modified through variations of either the number of protons, the number of electrons, or both. The polyaniline polymer can occur in several general forms including the so-called reduced form (leucoemeraldine base) possessing the general formula the partially oxidized so-called emeraldine base form, of the general formula and the fully oxidized so-called pernigraniline form, of the general formula In practice polyaniline generally exists as a mixture of the several forms with a general formula (I) of When $0 \leq y \leq 1$, the polyaniline polymers are referred to as poly(paraphenyleneamineimines) in which the oxidation state of the polymer continuously increases with decreasing value of y. The fully reduced poly(paraphenylenamine) is referred to as leucoemeraldine, having the repeating units indicated above corresponds to a value of y=0. The fully oxidizedpoly(paraphenyleneimine) is referred to as pernig-raniline, of repeat unit shown above corresponds to a value y=0. The partly oxidized poly(paraphenyleneimine) with y in the range of greater than or equal to 0.35 and less than or equal to 0.65 is termed emeraldine, though the name emeraldine is often focused on y equal to or approximately 0.5 composition. Thus, the terms "leucoemeraldine", "emeraldine" and "pernigraniline" refer to different oxidation states of polyaniline. Each oxidation state can exist in the form of its base or in its protonated form (salt) by treatment of the base with an acid.

The use of the terms "protonated" and "partially protonated" herein includes, but is not limited to, the addition of hydrogen ions to the polymer by, for example, a protonic acid, such as an inorganic or organic acid. The use of the terms "protonated" and "partially protonated" herein also includes pseudoprotonation, wherein there is introduced into the polymer a cation such as, but not limited to, a metal ion, M+. For example, "50%" protonation of emeraldine leads formally to a composition of the formula:

Formally, the degree of protonation may vary from a ratio of [H+]/[—N=]=0 to a ratio of [H+]/[—N=]=1. Protonation or partial protonation at the amine (—NH—) sites may also occur.

The electrical and optical properties of the polyaniline polymers vary with the different oxidation states and the different forms. For example, the leucoemeraldine base forms of the polymer are electrically insulating while the emeraldine salt (protonated) form of the polymer is conductive. Protonation of the emeraldine base by aqueous HCl (1M HCl) to produce the corresponding salt brings about an increase in electrical conductivity of approximately $10^{10}$. The emeraldine salt form can also be achieved by electrochemical oxidation of the leucoemeraldine base polymer or electrochemical reduction of the pernigraniline base polymer in the presence of the electrolyte of the appropriate pH level.

Some of the typical organic acids used in doping emeraldine base to form conducting emeraldine salt are methane sulfonic acid (MSA) CH3-S03H, toluene sulfonic acid (TSA), dodecyl bezene sulphonic acid (DBSA), and camphor sulfonic acid (CSA).

Other examples of conductive polymers include conductive polymer compositions based on polypyrrole. Yet other conductive polymer compositions are conductive polymer compositions based on polyparaphenylene, polyacetylene, polythiophene, polyethylene dioxythiophene, polyparaphenylenevinylene.

In addition to an active electrode material and an electrically conductive polymer, the active composition of the present invention may include additional materials. For example, the active electrode composition may also include an additional conductive material (e.g., a conductive additive) which aids in the electrical conductivity within the electrode. The conductive material may include carbon. While carbon may be available in a variety of forms, its preferable form is a graphite or graphite containing composite. The conductive material may be a metallic material such as a pure metal or a metallic alloy. Metallic materials include, but not limited to, metallic nickel, a nickel alloy, metallic copper, copper alloy, metallic silver, silver alloy, metallic copper plated with metallic nickel, metallic nickel plated with metallic copper. The conductive material may include at least one periodic table element selected from the group consisting of carbon, copper, nickel, and, silver. That is, the conductive material may include at least one periodic table element selected from the group consisting of C, Cu, Ni and Ag.

The conductive material may be in the form of particles. The particles may have any shape and may be in the form of fibers. In addition, any other conductive material which is compatible with the environment of the electrode may also be used. (The electrode environment includes factors such as pH of the surrounding electrolyte as well as potential of the electrode itself). The conductive materials may be physically mixed together with the active electrode material.

The active electrode composition of the present invention may further include a Raney catalyst, a Raney alloy or some mixture thereof. A Raney process refers to a process for making a porous, active metal catalyst by first forming at least a binary alloy of metals, where at least one of the metals can be extracted, and then extracting that metal whereby a porous residue is obtained of the insoluble metal which has activity as a catalyst. See for example, "Catalysts from Alloys-Nickel Catalysts" by M. Raney, Industrial and Engineering Chemistry, vol. 32, pg. 1199, September 1940. See also U.S. Pat. Nos. 1,628,190, 1,915,473, 2,139,602, 2,461,396, and 2,977,327. The disclosures of U.S. Pat. Nos. 1,628,190, 1,915,473, 2,139,602, 2,461,396, and 2,977,327 are all incorporated by reference herein. A Raney process metal refers to any of a certain group of the insoluble metals well known in the Raney process art which remain as the porous residue. Examples of insoluble Raney process metals include, not limited to, nickel, cobalt, silver, copper and iron. Insoluble alloys of nickel, cobalt, silver, copper and iron may also be used.

A Raney alloy comprises an insoluble Raney process metal (or alloy) and a soluble metal (or alloy) such as aluminum, zinc, or manganese, etc. (Silicon may also be used as an extractable material). An example of a Raney alloy is a Raney nickel-aluminum alloy comprising the elements nickel and aluminum. Preferably, the Raney nickel-aluminum alloy comprises from about 25 to about 60 weight percent nickel and the remainder being essentially aluminum. More preferably, the Raney nickel-aluminum alloy comprises about 50 weight percent nickel and about 50 weight percent aluminum.

A Raney catalyst is a catalyst made by a Raney process which includes the step of leaching out the soluble metal from the Raney alloy. The leaching step may be carried out by subjecting the Raney alloy to an aqueous solution of an alkali metal hydroxide such as sodium hydroxide, potassium hydroxide, lithium hydroxide, or mixtures thereof. After the leaching step, the remaining insoluble component of the Raney alloy forms the Raney catalyst.

An example of a Raney catalyst is Raney nickel. Raney nickel may be formed by subjecting the Raney nickel-aluminum alloy discussed above to the Raney process whereby most of the soluble aluminum is leached out of the alloy. The remaining Raney nickel may comprise over 95 weight percent of nickel. For example, a Raney alloy in the form of a 50:50 alloy of aluminum and nickel (preferably in the form of a powder) may be placed in contact with an alkaline solution. The aluminum dissolves in the solution thereby leaving behind a finely divided Raney nickel particulate. (The particulate may then be filtered off and added to the active electrode composition of the present invention). Other examples of Raney catalysts are Raney cobalt, Raney silver, Raney copper, and Raney iron.

A Raney catalyst and/or a Raney alloy may be added to an electrode of an electrochemical cell. In particular, a Raney catalyst and/or a Raney alloy may be added to a negative electrode of a battery cell or a fuel cell. Also, a Raney catalyst and/or a Raney alloy may be added to a positive electrode of a battery cell or a fuel cell. The Raney catalyst and/or Raney alloy may be added to the electrodes in many different ways. For example, a Raney catalyst and/or Raney alloy may be added to the active composition of either the negative or the positive electrode.

The Raney catalyst and/or Raney alloy may be mixed with the active composition to form a mixture. For example, a Raney catalyst and/or Raney alloy may be mixed with an active electrode material (either an active negative electrode material or an active positive electrode material) and a conductive polymer (and possibly additional materials) to form an active composition in the form of a mixture. The mixture may then be formed into an electrode. For example, an electrode may be formed by applying the mixture to a conductive substrate.

The Raney catalyst and/or Raney alloy may be applied to one or more surfaces of an existing electrode. For example, a electrode may be formed by first applying an active electrode material to a conductive substrate and then applying a Raney catalyst and/or Raney alloy to an outer surface of the active electrode material). The Raney catalyst and/or Raney alloy may exist as a discrete outer layer of the electrode. The thickness of this Raney catalyst and/or Raney alloy layer may be as thin as 30 Angstroms or less. Alternately, it may be as high as 2 microns or more. The actual thickness used depends, as least partially, upon the catalytic activity of Raney catalyst used. Alternately, the Raney catalyst and/or Raney alloy that is applied to an outer surface of an electrode may pass below the surface and enter the bulk of the electrode. Hence, the Raney catalyst and/or Raney alloy may form a graded structure having a higher concentration at the surface of the electrode and a lower concentration inside the bulk of the electrode. Also, the Raney catalyst and/or Raney alloy may be layered or continually graded within the bulk of the electrode.

The Raney catalyst and/or Raney alloy may also be deposited onto the surface of each of the active electrode material particles. This may provide for increases catalytic activity throughout the entire bulk of the electrode material. The Raney catalyst and/or Raney alloy may or may not completely coat each of the active material particles. The Raney catalyst and/or Raney alloy coatings may have a thickness from about 20 Angstroms to about 150 Angstroms.

As noted above, a Raney alloy may be added to the electrodes (negative electrodes and/or positive electrodes) of a battery cell or a fuel cell instead of (or in addition to) a Raney catalyst. It may thus be possible to form the Raney catalyst "in situ" by adding a Raney alloy to the negative electrode or the positive electrode. For example, a Raney alloy (such as a nickel-aluminum alloy) may be mixed in with a hydrogen storage alloy to form an active composition for a negative electrode of an alkaline nickel-metal hydride battery cell. The alkaline electrolyte of the battery cell may then leach out the aluminum so that a Raney nickel catalyst is thus formed. As noted above, the Raney alloy may be added to the electrodes in any way.

Further discussion of the Raney alloys and Raney catalysts is provided in U.S. Pat. No. 6,218,047, the disclosure of which is hereby incorporated by reference herein.

In addition to the conductive polymer, the active composition of the present invention may also include an additional binder material which can further increase the particle-to-particle bonding of the active electrode material as well as the particle-to-substrate bonding between the active electrode material and an electrode substrate that may be used to support the active composition. The binder materials may, for example, be any material which binds the active material together so as to prevent degradation of the electrode during its lifetime. Binder materials should preferably be resistant to the conditions present within the electrochemical cells. Examples of additional binder materials, which may be added to the active composition, include, but are not limited to, polymeric binders such as polyvinyl alcohol (PVA), carboxymethyl cellulose (CMC) and hydroxypropylymethyl cellulose (HPMC). Other examples of polymeric binders include fluoropolymers. An example of a fluoropolymer is polytetrafluoroethylene (PTFE). Other examples of additional binder materials, which may be added to the active composition, include elastomeric polymers such as styrene-butadiene. In addition, depending upon the application, additional hydrophobic materials may be added to the active composition (hence, the additional binder material may be hydrophobic).

The active composition may be formed as a mixture. The mixture may be formed by physically mixing the active electrode material with the conductive polymer (and, optionally, with any of the other additive materials, such as the conductive materials, Raney catalysts, Raney alloys or additional binders). Mixing may be accomplished by a ball mill (with or without the mixing balls), a blending mill, a sieve, or the like. The mixture may be in the form of a dry mixture or in the form of a wet mixture. A wet mixture may formed as a paste by adding water and a "thickener" such as carboxymethyl cellulose (CMC) or hydroxypropylmethyl cellulose (HPMC) to the active composition.

The conductive polymer is preferably between about 0.1 weight percent and about 10 weight percent of the active composition. More preferably, the conductive polymer is between about 0.2 and about 5 weight percent of the active composition. Most preferably, the conductive polymer is between about 0.2 and 2 weight percent of the active composition. In one embodiment, the conductive polymer may be between about 0.4 and 1.2 weight percent of the active composition. As a specific example, an active composition for the negative electrode of a fuel cell includes 80 wt % hydrogen storage alloy, 15 wt % Raney nickel, 0.7 wt % PTFE, 0.8 wt % conductive polymer, and 3.5 wt % graphite.

As noted above, the active composition of the present invention may be used as the active composition for an electrode of an electrochemical cell. Hence, also disclosed herein in an electrode for an electrochemical cell. The electrode comprises the active composition described above which includes an active electrode material and a conductive polymer. The electrode may be a positive or negative electrode for a battery cell. Alternately, the electrode may be a positive electrode (also referred to as the air electrode or cathode) of a fuel cell, or the electrode may be a negative electrode (also referred to as the hydrogen electrode or anode) of a fuel cell. The electrode may be formed in any way. The electrode may be formed by affixing the active electrode composition onto a conductive substrate. The active composition may be affixed to the substrate in many ways. The electrode may be a paste-type electrode. For example, the electrode may be formed by first making the active composition into a paste and then applying the paste to a conductive substrate. The paste may be formed by adding water and a "thickener" such as carboxymethyl cellulose (CMC) or hydroxypropylmethyl cellulose (HPMC) The paste would then be applied to a conductive substrate. The electrode may then be compressed and may be sintered after it is compressed.

The electrode may be a non-paste type electrode whereby the active composition is in the form of a dry powder. The dry powder is applied to a conductive substrate and then compressed onto the substrate (possibly by one or more rolling mills). The electrode may be sintered after it is compressed.

Alternately, the electrode may be formed by first forming the active composition into a ribbon of the active composition and then affixing the ribbon onto a conductive substrate. The ribbons may be formed by compressing the active composition in a rolling mill. The roll mill forms the ribbons. The ribbons may have a thickness between about 0.018 Angstroms to about 0.02 Angstroms. After the ribbon is formed, it is placed onto a conductive substrate and compressed onto the conductive substrate (a rolling mill may also be used for this compression). The electrode may then be sintered.

It is noted that when electrodes include a conductive polymer, the sintering may be performed in the range of about 170° to about 180° C. so as not to decompose the conductive polymer. Alternately, if a conductive polymer is not used in the electrodes, then sintering may be performed in the range of about 310° C. to about 330° C.

The conductive substrate may be may be any electrically conductive support structure that can be used to hold the active composition. Examples include conductive mesh, grid, foam, expanded metal and perforated metal. In a particular embodiment, the grid or mesh may have at least 40 wires per inch horizontally and 20 wires per inch vertically. The wires comprising the mesh or grid preferably have a diameter between 0.005 inches and 0.01 inches and more preferably have a diameter between between 0.005 inches and 0.008 inches. The actual form of the substrate used may depend on whether the substrate is used for the positive or the negative electrode of the electrochemical cell, the type of electrochemical cell (for example, battery or fuel cell), the type of active material used, and whether it is paste type or non-paste type electrode.

The conductive substrate may be formed of any electrically conductive material and is preferably formed of a metallic material such as a pure metal or a metal alloy. Examples of materials that may be used include metallic nickel, nickel alloy, metallic copper, copper alloy, nickel-plated metals such as metallic nickel plated with metallic copper and metallic copper plated with metallic nickel. The actual material used for the substrate depends upon many factors including whether the substrate is being used for the positive or negative electrode, the type of electrochemical cell (for example battery or fuel cell), the potential of the electrode, and the pH of the electrolyte of the electrochemical cell.

It is noted that an electrode may be formed without a conductive substrate. For example, conductive fibers may be mixed in with the active composition to form the necessary conductive collecting pathways.

An example of an electrode of the present invention is a nickel hydroxide electrode (also referred to as a nickel electrode). In this case, the active electrode composition comprises a nickel hydroxide material and a conductive polymer. Any nickel hydroxide material may be used. Examples of nickel hydroxide materials are provided above. The nickel hydroxide electrode may be used as the positive electrode of a battery cell. For example, the nickel hydroxide electrode may be used as a positive electrode of a nickel-metal hydride battery cell, a nickel-cadmium battery cell, a nickel zinc battery cell, a nickel iron battery cell or a nickel hydrogen battery cell.

Preferably, the nickel hydroxide electrode is formed by first mixing a nickel hydroxide active material with a conductive polymer to form an active composition in the form of a mixture. Other components (such as conductive components, Raney catalysts, Raney alloys, other binders, etc) may also be added to the mixture. The mixture is preferably made into a paste and applied to a conductive substrate.

Another example of an electrode of the present invention is a hydrogen storage alloy electrode. In this case the active composition includes a hydrogen storage alloy and an electrically conductive polymer. Any hydrogen storage alloy may be used. Examples of hydrogen storage alloys are discussed above. The hydrogen storage alloy electrode may be used as the negative electrode for a battery cell such as a nickel-metal hydride battery cell. Also, as discussed in more detail below, the hydrogen storage alloy electrode may be used as the negative electrode of a fuel cell. The hydrogen storage alloy electrode may be formed in different ways. Preferably, an active composition that includes a hydrogen storage alloy and a conductive binder is formed as a mixture. The mixture may include additional components such as conductive materials, a Raney catalyst, a Raney alloy, other binders, etc. The mixture may be made into a paste an applied to a conductive substrate. As an example, the active composition for a hydrogen storage alloy electrode may include by weight 75 to 85% of hydrogen storage alloy material, 12 to 18% Raney catalyst, 0.0 to 3.0% binder material, 0.0 to 5.0% conductive material, and 0.0 to 8.0% conductive polymer material.

Also disclosed herein is an electrochemical cell comprising at least one positive electrode, at least one negative electrode, and an electrolyte. At least one of the positive electrodes and/or at least one of the negative electrodes includes an active electrode composition of the type described above. That is, the active composition includes an active electrode material and a conductive polymer. Any electrochemical cell that includes an active composition of this type is within the scope of this invention.

Preferably, the electrolyte of the electrochemical cell is an alkaline electrolyte. The alkaline electrolyte is preferably an aqueous solution of an alkali metal hydroxide. Examples of alkali metal hydroxides include potassium hydroxide, sodium hydroxide, lithium hydroxide, and mixtures thereof. Preferably, the alkali metal hydroxide is potassium hydroxide.

The electrochemical cell may be a battery cell. One embodiment of a battery of the present invention is a nickel-metal hydride battery. The nickel-metal hydride battery includes at least one hydrogen storage alloy negative electrode, at least one nickel hydroxide positive electrode and an alkaline electrolyte. At least one of the negative electrodes and/or at least one of the positive electrodes includes an active composition that includes a conductive polymer.

The electrochemical cell may also be a fuel cell. Fuel cells, like batteries, operate by utilizing electrochemical reactions. Unlike a battery in which chemical energy is stored within the cell, fuel cells generally are supplied with reactants from outside the cell. The fuel cell may be any type of fuel cell. Examples of fuel cells include alkaline fuel cells and PEM fuel cells.

Figure 1:
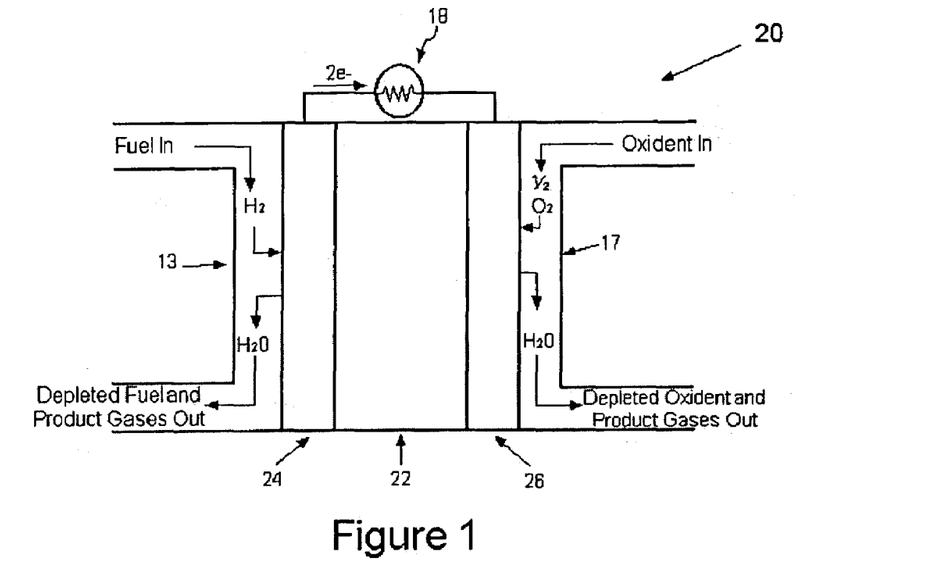
FIG. 1 is diagram of an alkaline fuel cell.

The fuel cell includes at least one negative electrode and at least one positive electrode. The negative electrode serves as the hydrogen electrode or anode of the fuel cell while the positive electrode serves as the air electrode or cathode of the fuel cell. An example of an alkaline fuel cell is shown in FIG. 1. As shown in FIG. 1, an alkaline fuel cell 20 comprises an anode 24, a cathode 26 and an alkaline electrolyte 22 held within a porous non-conducting matrix between the anode 24 and the cathode 26. As noted above, the alkaline material is preferably an aqueous solution of an alkali metal hydroxide. The alkali metal hydroxide may include one or more of potassium hydroxide, lithium hydroxide or sodium hydroxide. Potassium hydroxide is typically used as the electrolyte in an alkaline fuel cell.

Figure 2:
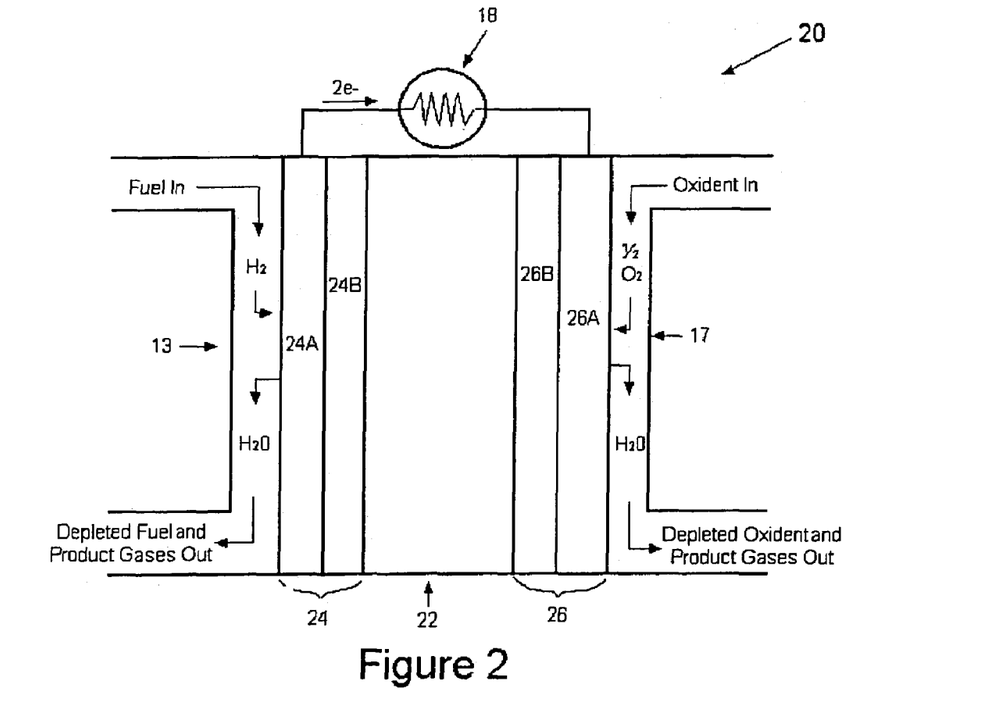
FIG. 2 is a diagram of an embodiment of alkaline fuel cell showing an anode and a cathode that each includes a conductive substrate.

Referring now to FIG. 2, in one embodiment of the invention, the anode 24 comprises a conductive substrate 24A and an anode layer 24B layer supported on the substrate 24A. The cathode 26 comprises a conductive substrate 26A and a cathode layer 26B support on the substrate 26A.

A hydrogen gas is fed to the anode 24 and an oxygen gas is fed to the cathode 26. In the embodiment shown, the hydrogen gas is fed to the anode 24 via the hydrogen compartment 13, and the oxygen gas is fed to the cathode 26 via the oxygen/air compartment 17. The reactant gases pass through the electrodes to react with the electrolyte 22 in the presence of the catalyst to produce water, heat and electricity. At the anode 24 the hydrogen is electrochemically oxidized to form water and release electrons according to the reaction:

$$H_2(g)+2OH^-\text{---}>2H_2O+2e^- \quad (3)$$

The electrons so generated are conducted from the anode 24 through an external circuit to the cathode 26. At the cathode 26, the oxygen, water and electrons react to reduce the oxygen and form hydroxyl ions ($OH^-$) according to the reaction:

$$\tfrac{1}{2}O_2(g)+H_2O+2e^-\text{---}>2OH^- \quad (4)$$

A flow of hydroxyl ($OH^-$) ions through the electrolyte 22 completes the electrical circuit. The flow of electrons is utilized to provide electrical energy for a load 18 externally connected to the anode (the negative electrode) and the cathode (the positive electrode).

The anode catalyst is the active electrode material of the negative electrode (the anode) of the fuel cell. Likewise, the cathode catalyst is the active electrode material of the positive electrode (the cathode) of the fuel cell. For an alkaline fuel cell, the anode catalyst catalyzes and accelerates the formation of H$^+$ ions and electrons (e$^-$) from H$_2$. This occurs via formation of atomic hydrogen from molecular hydrogen. The overall reaction (were M is the catalyst) is equation (5) below:

$$M+H_2 \rightarrow 2MH+2H^++2e^- \quad (5)$$

Thus the anode catalyst catalyzes the formation of water at the electrolyte interface and also efficiently dissociates molecular hydrogen into ionic hydrogen. Examples of possible anode catalysts include materials that include one or more of the noble metals such as platinum, palladium and gold. Other anode catalysts include hydrogen storage alloys. Hence, the anode catalyst (that is, the active material for the negative electrode of the fuel cell) may be a hydrogen storage alloy. Generally, any hydrogen storage alloy may be used as the anode catalyst.

As discussed, the anode 24 may be formed so that the active material is applied onto a conductive substrate. An example of this type of structure is shown in FIG. 2 where an anode layer 24B affixed to a conductive substrate 24A. The anode layer includes an active electrode composition (also referred to as an active anode composition) that includes the anode catalyst. The active anode composition (that is, the active composition of the negative electrode of the fuel cell) preferably also includes a conductive polymer. The active anode composition preferably further includes a polymeric hydrophobic material. An example of a polymeric hydrophobic material is PTFE. The active anode composition may be formed as a mixture of the anode catalyst, the conductive polymer and the hydrophobic material. The hydrophobic material binds the anode layer together and provides a network of channels through which reactant gases gain access to the catalytic surface of the active material. The hydrophobic material also prevents the electrolyte from entering the hydrogen compartment 13. In addition, the active anode material may include other components such as conductive materials, Raney catalysts and Raney alloys. An example of an alkaline fuel cell using a hydrogen storage alloy as an anode catalyst is provided in U.S. Pat. No. 6,447,942, the disclosure of which is incorporated by reference herein.

As noted, the positive electrode of the fuel cell is the air electrode or cathode of the fuel cell. The fuel cell cathode includes an active cathode material which is preferably catalytic to the dissociation of molecular oxygen into atomic oxygen and catalytic to the formation of hydroxide ions (OH$^-$) from water and oxygen ions. An example of a active cathode material is a non-noble metal. For example, silver may be used such as silver as the active cathode material. The silver may be distributed onto a carbon support. The active cathode material may include at least one transition metal. The cathode may be formed the same as a conventional cathode which uses a platinum catalyst, but a non-noble metal catalyst is substituted for the noble metal.

The fuel cell cathode may be formed by applying an active composition for the cathode onto a conductive substrate. Referring to FIG. 2, the cathode 26 comprises a cathode layer 26B affixed to a conductive substrate 26A. The cathode layer comprises an active composition (also referred to as an active cathode composition) that includes the cathode catalyst. The active cathode composition preferably also includes a conductive polymer. The cathode composition preferably further includes a polymeric hydrophobic material. An example of a polymeric hydrophobic material is PTFE. The active cathode composition may be formed as a mixture of the cathode active material (i.e., the cathode catalyst), the conductive polymer and the hydrophobic material.

EXAMPLE 1

A control nickel-metal hydride tri-electrode battery cell (control cell) is formed having a hydrogen storage alloy negative electrode, a nickel hydroxide positive electrode and an Hg/HgO reference electrode. The nickel hydroxide positive electrode includes an active electrode composition formed by physically mixing 88.6 wt % of nickel hydroxide material, 5 wt % Co powder, 6 wt % CoO powder and 0.4 wt % PVA binder. The active electrode composition is made into a paste and applied onto a conductive nickel foam to form the positive electrode.

A test nickel-metal hydride tri-electrode battery cell (test battery cell) is formed using a hydrogen storage alloy negative electrode (same type of electrode as used in the control cell), a nickel hydroxide positive electrode and an Hg/HgO reference electrode. The nickel hydroxide positive electrode includes an active electrode composition formed by physically mixing 88.6 wt % of nickel hydroxide material, 5 wt % Co power, 6 wt % CoO powder and 0.4 wt % conductive polyaniline binder. The active electrode composition is made into a paste and applied onto a conductive nickel foam to form the positive electrode.

Figure 3:
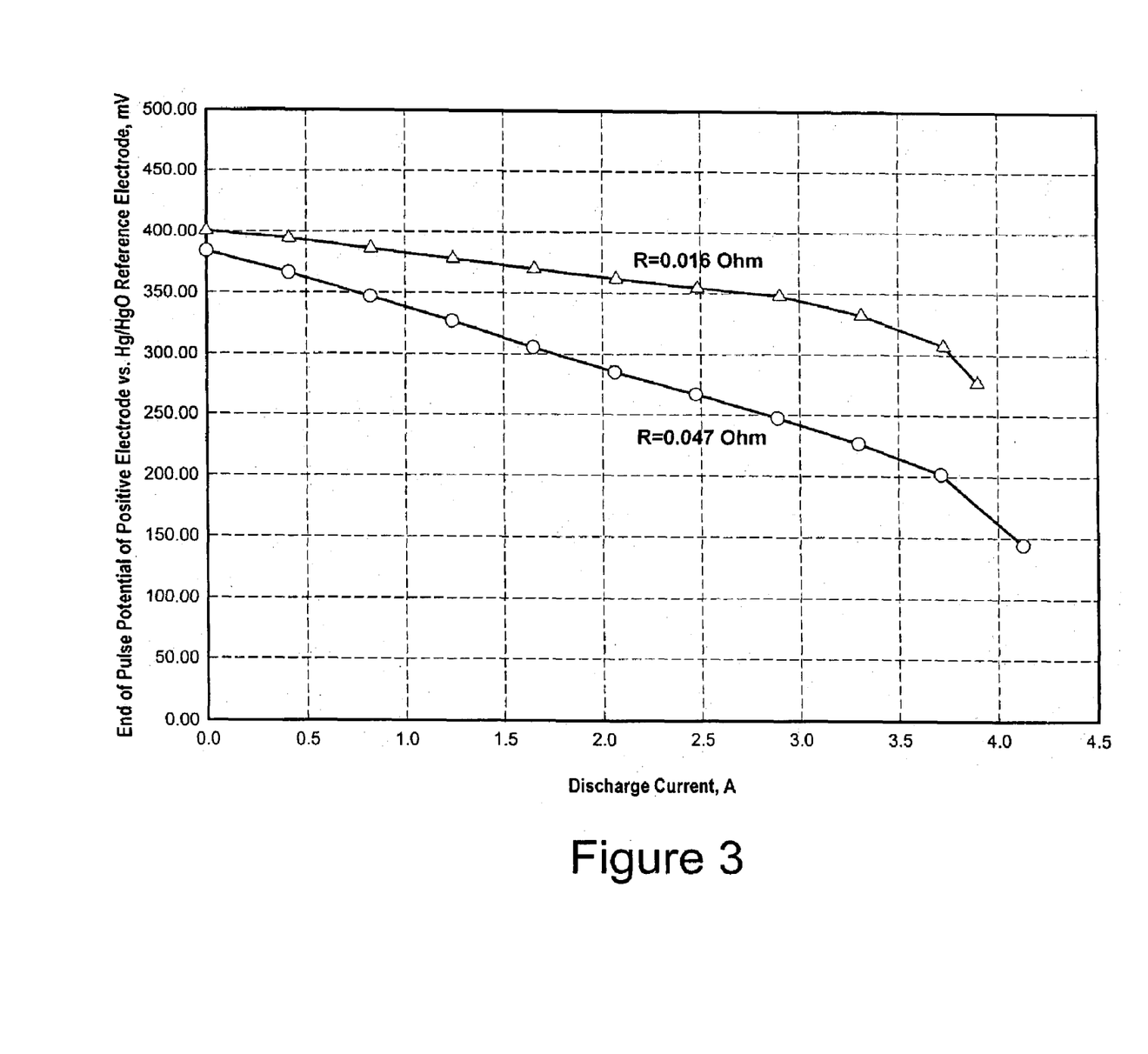
FIG. 3 is a graph showing the end of pulse potential of a positive electrode as a function of discharge current for tri-electrode battery cell having positive electrode formed without a conductive polymer and a tri-electrode battery cell having positive electrodes formed with a conductive polymer.

The control cell (without the conductive binder) and the test cell (with the conductive binder) are each discharged to 50% depth of discharge at constant discharge current. The control cell and the test cell are each subjected to a sequence of 10 second discharge pulses of increasing magnitude (0.5 amp, 1 amp, 1.5 amp, etc.). The voltage of the positive electrode at the end of each of the discharge current pulses is measured relative to the Hg/HgO reference electrode. The voltage values (at the end of each of the discharge current pulses) versus the value of the discharge currents for both the control cell (o) as well as the test cell (Δ) are shown in FIG. 3. The slopes of the linear portion of the two plots show that the resistance of the electrode made with the conductive binder (Δ) is less than the resistance of the electrode made without the conductive binder (o).

EXAMPLE 2

A control nickel-metal hydride battery cell (control cell) is formed having hydrogen storage alloy negative electrodes and nickel hydroxide positive electrodes (where the number of negative electrodes is one greater than the number of positive electrode). The nickel hydroxide positive electrode includes an active electrode composition formed by physically mixing 88.6 wt % of nickel hydroxide material, 5 wt % Co powder, 6 wt % CoO powder and 0.4 wt % PVA binder. The active electrode composition is made into a paste and applied onto a conductive nickel foam to form the positive electrode.

A test nickel-metal hydride battery cell (test battery) is formed having hydrogen storage alloy negative electrodes (same type of electrode as used in the control cell) and nickel hydroxide positive electrodes (where the number of negative and positive electrodes of the test are the same as that of the control cell). The nickel hydroxide positive electrode includes an active electrode composition formed by physically mixing 88.6 wt % of nickel hydroxide material, 5 wt % Co power, 6 wt % CoO powder and 0.4 wt % conductive polyaniline binder. The active electrode composition is made into a paste and applied onto a conductive nickel foam to form the positive electrode.

Figure 4:
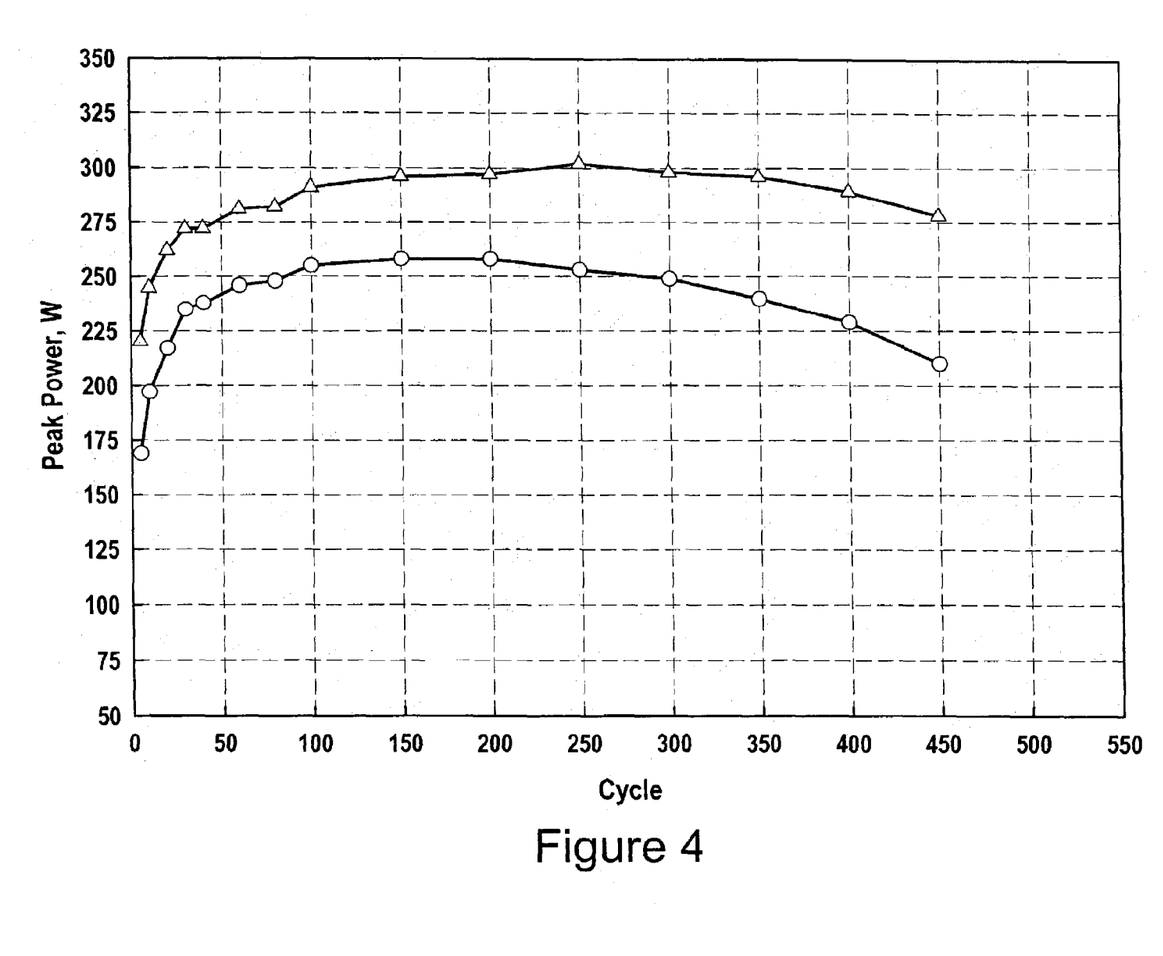
FIG. 4 is a graph showing peak power versus cycle number for a nickel-metal hydride battery cell having positive electrodes made without a conductive binder and a nickel-metal hydride battery cell having positive electrodes may with a conductive polymer.

The test and control batteries are cycled. The peak power of the control battery cell (o) (without the conductive binder) and the peak power of the test battery cell (Δ) (with the conductive binder) is determined at different charge/discharge cycles. The peak power (in Watts) versus the number of cycles is shown in FIG. 4. As shown, the delivered peak power of the test battery cell (Δ) made with the conductive polymer has a higher peak power than the control battery cell (o) made without the conductive binder. It is noted that the control and test batteries were made for testing purposes only may not have optimized power.

EXAMPLE 3

A control half-cell for a fuel cell was made using a negative electrode (the hydrogen electrode or anode), a counter electrode and a Hg/HgO reference electrode. The active composition of the negative electrode includes an active electrode composition formed by physically mixing 80 wt % of a hydrogen storage alloy, 15 wt % Raney nickel, 1.5 wt % PTFE binder and 3.5% graphite.

A test half-cell for a fuel cell was made using a negative electrode (the hydrogen electrode or anode) and a Hg/HgO reference electrode. The active composition of the negative electrode includes 80 wt % of the same hydrogen storage alloy used in the control half-cell, 15 wt % Raney nickel, 0.7 wt % PTFE binder, 0.8 wt % conductive polyaniline binder and 3.5 wt % graphite. It is noted that the total amount of binder in both the control and test half-cells is 1.5 wt %.

Figure 5:
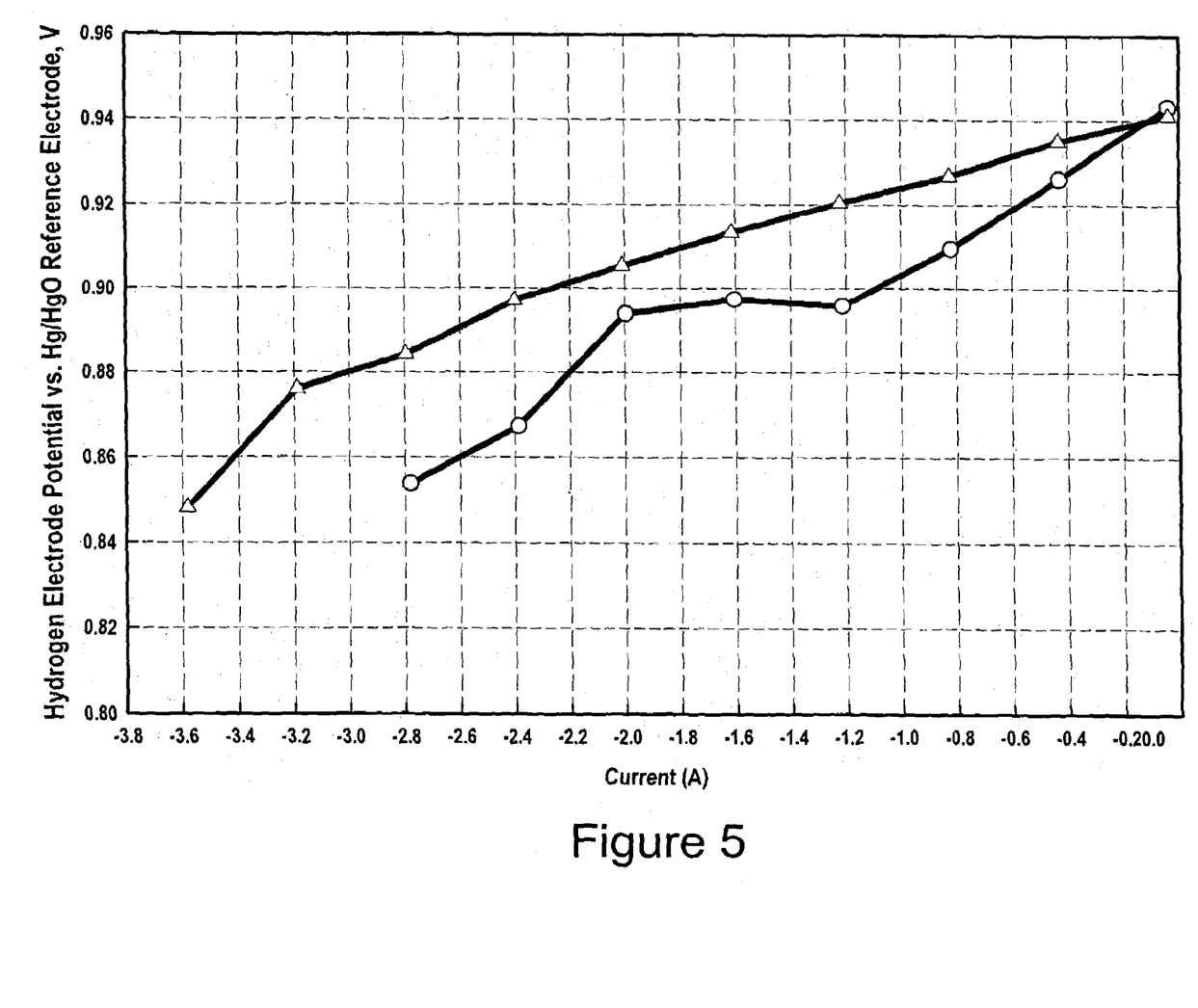
FIG. 5 is a graph showing hydrogen electrode potential versus scanned discharge current for a fuel cell having negative electrodes made without a conductive polymer and a fuel cell having negative electrodes made with a conductive polymer.

The negative electrode of both the control (o) and test (Δ) half-cells are discharged (under the same conditions with respect to hydrogen pressure and flow, temperature, etc.) at a continuously increasing discharge current. The voltages of each of the negative electrodes (versus the HgO/Hg reference electrode) are measured. The results of the tests are shown in FIG. 5. As shown in FIG. 5, the negative electrode of the test half-cell (Δ) provides a higher voltage than the negative electrode of the control half-cell (o) at the same current.

While the invention has been described in connection with preferred embodiments and procedures, it is to be understood that it is not intended to limit the invention to the preferred embodiments and procedures. On the contrary, it is intended to cover all alternatives, modifications and equivalence, which may be included within the spirit and scope of the invention as defined by the claims appended hereinafter.

We claim:

1. An electrochemical cell, comprising:
a positive electrode;
a negative electrode including a hydrogen storage alloy; and
an electrolyte,
wherein said positive electrode comprises an active composition including a nickel hydroxide material, cobalt, cobalt oxide and a conductive polymer, the weight percentage of said conductive polymer being between about 0.1 weight percent and about 0.8 weight percent of said active composition,
wherein said conductive polymer includes at least one material selected from the group consisting of polyaniline based polymers, polypyrrole based polymers, polyparaphenylene based polymers, polyacetylene based polymers, polythiophene based polymers, polyethylene based polymers, dioxythiophene based polymers, polyparaphenylenevinylene based polymers, and mixtures thereof.

2. The electrochemical cell of claim 1, wherein said hydrogen storage alloy is selected from the group consisting of rare-earth/Misch metal alloys, zirconium alloys, titanium alloys, and mixtures or alloys thereof.

3. The electrochemical cell of claim 1, wherein said electrolyte is an alkaline material.

4. The electrochemical cell of claim 3, wherein said alkaline material is an aqueous solution of an alkali metal hydroxide.

5. The electrochemical cell of claim 4, wherein said alkali metal hydroxide includes at least one material selected from the group consisting of potassium hydroxide, a lithium hydroxide, and sodium hydroxide.

6. The electrochemical cell of claim 1, wherein said active composition is a mixture.

7. The electrochemical cell of claim 1, wherein the weight percentage of said conductive polymer is between about 0.4 weight percent and about 0.8 weight percent of said active composition.

8. The electrochemical cell of claim 1, wherein said active composition further comprises at least one material selected from the group consisting of Raney catalyst and Raney alloy.

9. The electrochemical cell of claim 8, wherein said Raney catalytic material is chosen from the group consisting of Raney nickel, Raney cobalt, Raney silver, Raney copper, Raney iron and mixtures thereof.

10. The electrochemical cell of claim 1, wherein said active composition further comprises a conductive additive.

11. The active composition according to claim 10, wherein said conductive additive includes a periodic table element selected from the group consisting carbon, nickel, copper, and silver.

12. The electrochemical cell of claim 1, wherein said electrochemical cell is a battery.

* * * * *